US009652722B1

(12) United States Patent
Narsky

(10) Patent No.: US 9,652,722 B1
(45) Date of Patent: May 16, 2017

(54) METHODS AND SYSTEMS FOR ROBUST SUPERVISED MACHINE LEARNING

(71) Applicant: The MathWorks, Inc., Natick, MA (US)

(72) Inventor: Ilya Narsky, Newton, MA (US)

(73) Assignee: The Mathworks, Inc., Natick, MA (US)

(*) Notice: Subject to any disclaimer, the term of this patent is extended or adjusted under 35 U.S.C. 154(b) by 462 days.

(21) Appl. No.: 14/098,014

(22) Filed: Dec. 5, 2013

(51) Int. Cl.
*G06F 15/18* (2006.01)
*G06N 99/00* (2010.01)

(52) U.S. Cl.
CPC .................. *G06N 99/005* (2013.01)

(58) Field of Classification Search
None
See application file for complete search history.

(56) References Cited

U.S. PATENT DOCUMENTS

| | | | | |
|---|---|---|---|---|
| 8,359,226 B2* | 1/2013 | Abe | ................ | G06Q 10/06315 705/7.31 |
| 2002/0093919 A1* | 7/2002 | Bershad | .................. | H04B 3/23 370/286 |
| 2004/0064426 A1* | 4/2004 | Depold | .................... | G06N 3/04 706/26 |
| 2010/0093651 A1* | 4/2010 | Brando | ................ | C07D 493/18 514/32 |
| 2011/0224913 A1* | 9/2011 | Cui | .......................... | G06F 19/18 702/19 |
| 2014/0029840 A1* | 1/2014 | Jebara | .................. | G06K 9/6256 382/159 |
| 2014/0094379 A1* | 4/2014 | Harkin | ................. | C12Q 1/6886 506/9 |

OTHER PUBLICATIONS

R. Collobert, F. Sinz, J. Weston, and L. Bottou. "Trading Convexity for Scalability." Proceedings of the 23rd International Conference on Machine Learning, ICML '06, pp. 201-208, Pittsburgh, PA, USA, 2006. ACM.

(Continued)

*Primary Examiner* — Kakali Chaki
*Assistant Examiner* — Michael Zidanic
(74) *Attorney, Agent, or Firm* — Finnegan, Henderson, Farabow, Garrett & Dunner, LLP

(57) ABSTRACT

A disclosed method may include iterating a model optimization process, the iterating including one or more iterations. The method may also include updating a classification model based on the iterating, the updating performed using training data. The method may further include generating a final version of the classification model based on a final iteration. The method may also include setting a parameter (q), the parameter corresponding to a total number of observations (Q) that are to be removed from the training data by the final iteration. The method may further include determining one or more corresponding numbers of observations to remove from the training data, where the corresponding number of observations are to be removed at some of select iterations $t_k$, and the corresponding number of observations are to be removed based on the number Q and an estimate of the number of iterations remaining until the final iteration.

20 Claims, 7 Drawing Sheets

(56) References Cited

OTHER PUBLICATIONS

S. Ertekin, L. Bottou, and C.L. Giles. Ignorance is bliss: "Non-Convex Online Support Vector Machines." IEEE Transactions on Pattern Recognition and Machine Intelligence, vol. 33(2):368-381, Feb. 2011.
Y. Ma, L. Li, X. Huang, and S. Wang. "Robust Support Vector Machine Using Least Median Loss Penalty." Proceedings of the $18^{th}$ IFAC World Congress, The International Federation of Automatic Control, Milano, Italy, Aug. 28-Sep. 2, 2011, vol. 18, pp. 11208-11213.
L. Xu, K. Crammer, and D. Schuurmans. "Robust Support Vector Machine Training via Convex Outlier Ablation." Proceedings of the 21st National Conference, American Association for Artificial intelligence, vol. 1, AAAI '06, pp. 536-542. AAAI Press, 2006.
Y. Freund. "An Adaptive Version of the Boost by Majority Algorithm." Proceedings of the 12th Annual Conference on Computational Learning Theory, Machine Learning, vol. 43, 293-318, 2001.
Y. Freund. "A more Robust Boosting Algorithm" arXiv:0905.2138v1, May 13, 2009.

\* cited by examiner

METHODS AND SYSTEMS FOR ROBUST SUPERVISED MACHINE LEARNING

TECHNICAL FIELD

The present disclosure relates generally to methods and systems for robust supervised machine learning.

BACKGROUND

In the field of machine learning, one goal is to separate data into classifications based on patterns. Supervised learning is one type of machine learning, in which a classification model is generated based on a data set comprising observations (each observation being a data point) that belongs to known classes, also referred to as labels. The classification model that is generated by supervised learning can then be applied to classify other data sets to predict the labels of the observations in those data sets, which are not known.

Generation of a classification model by supervised learning is based on using a specific type of model. Support vector machine (SVM) is one popular classification model. An SVM model is characterized by a decision boundary, which is a function that defines the boundary between observations that should be classified into different classes. A generalized SVM model may have a simple decision boundary, e.g., a linear decision boundary, which does not classify every observation in the training data set correctly. A less generalized SVM model may have a highly non-linear decision boundary, e.g., a very squiggly decision boundary, which classifies every observation in the training data set correctly. If a generalized SVM model consistently classifies data with an acceptable rate of classification accuracy over a range of different data sets, the SVM model is robust. Less generalized SVM models may perform inconsistently over a range of different data sets, because the decision boundary was generated so specifically to the training data set. These SVM models are not robust. The disclosed methods and systems are directed to generating robust SVM models based on removing outliers from the training data set.

DETAILED DESCRIPTION

Figure 1:
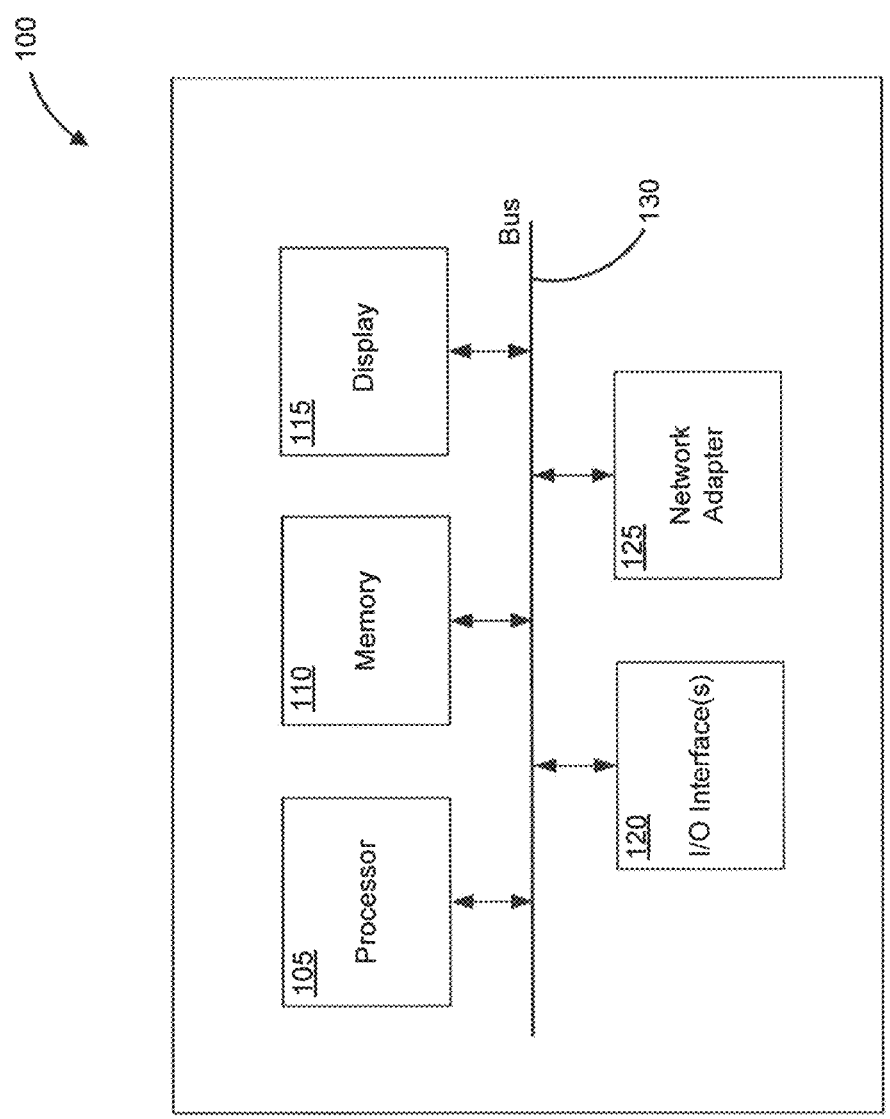
FIG. 1 illustrates a block diagram of an exemplary computing system 100 for generating a classification model.

The following detailed description refers to the accompanying drawings. Wherever possible, the same reference numbers are used in the drawings and the description to refer to the same or similar parts. Also, similarly named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments. While several exemplary embodiments and features are described, modifications, adaptations, and other implementations may be possible, without departing from the spirit and scope of the invention. Accordingly, unless stated otherwise, the descriptions relate to one or more embodiments and should not be construed to limit the inventions as a whole. Instead, the proper scope of the inventions is defined by the appended claims.

FIG. 1 illustrates a block diagram of an exemplary computing system 100 for generating a classification model. System 100 may include a processor 105, a memory 110, a display 115, an I/O interface 120, and/or a network adapter 125. These units may communicate with each other via bus 130 and/or wirelessly. The components shown in FIG. 1 may reside in a single device or across multiple devices (e.g., in a distributed computing embodiment).

In various embodiments, processor 105 may be one or more processing devices, such as a microprocessor or a central processor unit (CPU) and may perform various methods in accordance with disclosed embodiments. Memory 110 may include a non-transitory machine-readable medium, such as a computer hard disk, a random access memory (RAM), a removable storage, a remote computer storage, etc. In various embodiments, memory 110 stores various software programs executed by processor 105.

Display 115 may be any device which provides a visual output, for example, a computer monitor, an LCD screen, etc. I/O interfaces 120 may be any device which receives inputs and/or provide outputs, including a keyboard, a mouse, an audio input device, a touch screen, an infrared input interface, etc. In some embodiments, the I/O device is an interface for receiving and sending data to a user or to another system. In various embodiments, the I/O device includes an input interface and an output interface. The input interface is configured to receive data (such as commands, input parameters, and training data) and the output interface is configured to output information (such as a classification model or classifications of data). In some embodiments, the I/O module may include an internet interface, a wireless interface, a data reader, a printer, etc. Network adapter 125 may enable system 100 to exchange information with external networks. In various embodiments, network adapter 125 may include a wireless wide area network (WWAN) adapter, or a local area network (LAN) adapter.

Figure 2:
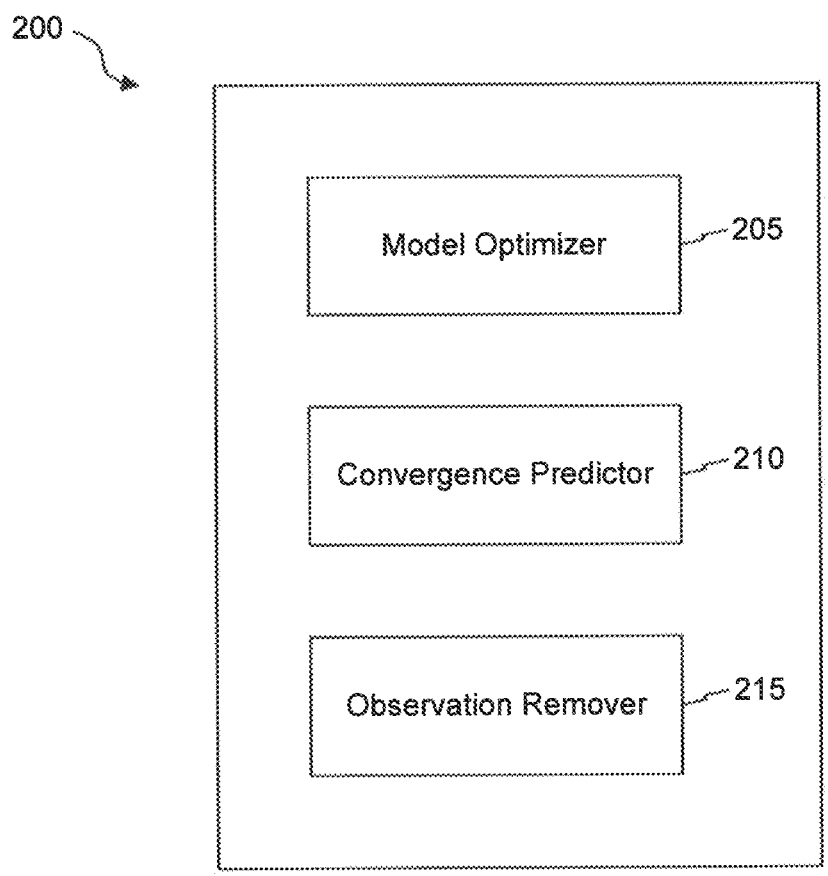
FIG. 2 illustrates a block diagram of an exemplary subsystem 200, implemented by a computing system, for generating a classification model.

FIG. 2 illustrates a block diagram of an exemplary subsystem 200 for generating a classification model comprising modules for generating a classification model. In various embodiments, one or more of the disclosed modules may be implemented by processor 105 executing software programs for performing the functionality of the corresponding modules. In some embodiments, the software programs may be stored on storage media, which may include non-transitory computer-readable media such as, for example, CD-ROM, a computer hard disk, firmware, flash memory, etc. which may be internal or external to the disclosed systems. The modules of subsystem 200 may include a model optimizer 205, a convergence predictor 210, and an observation remover 215.

Model optimizer 205 may receive training data and iterate a model optimization process that improves a classification model for the training data. With successive iterations, model optimizer 205 may generate an updated classification model, with improved classification accuracy. In an embodiment, each iteration may be associated with an iteration index t, e.g., 1 to T iterations. In one example, the classification model may be a SVM model and the optimization process may be, for example, an iterative single data algorithm (ISDA), a sequential minimal optimization (SMO), quadratic programming optimization, and/or any appropriate optimization process. In another example, the classification model may be something other than an SVM model, such as other types of classification models known in the art.

Convergence predictor 210 may record convergence criterions of the classification model. In an embodiment, convergence predictor 210 may record after the classification model is updated by an iteration of the model optimization process. The convergence criterion is a measure of how accurately the classification model classifies the observations in the training data. Convergence predictor 210 may record a convergence criterion at specific iterations, as discussed in further detail below.

At certain iterations, convergence predictor 210 may predict a trend of the convergence criterions with respect to the iteration index. Convergence predictor 210 may predict the trend based on the convergence criterions recorded at previous iterations, and may further predict a number of additional iterations needed before the convergence criterion of the classification model matches or is below a desired tolerance threshold.

Observation remover 215 may remove observations from the training data after some number of iterations. For example, observation remover 215 may determine how many observations to remove based on the predictions generated by convergence predictor 210.

Figure 3:
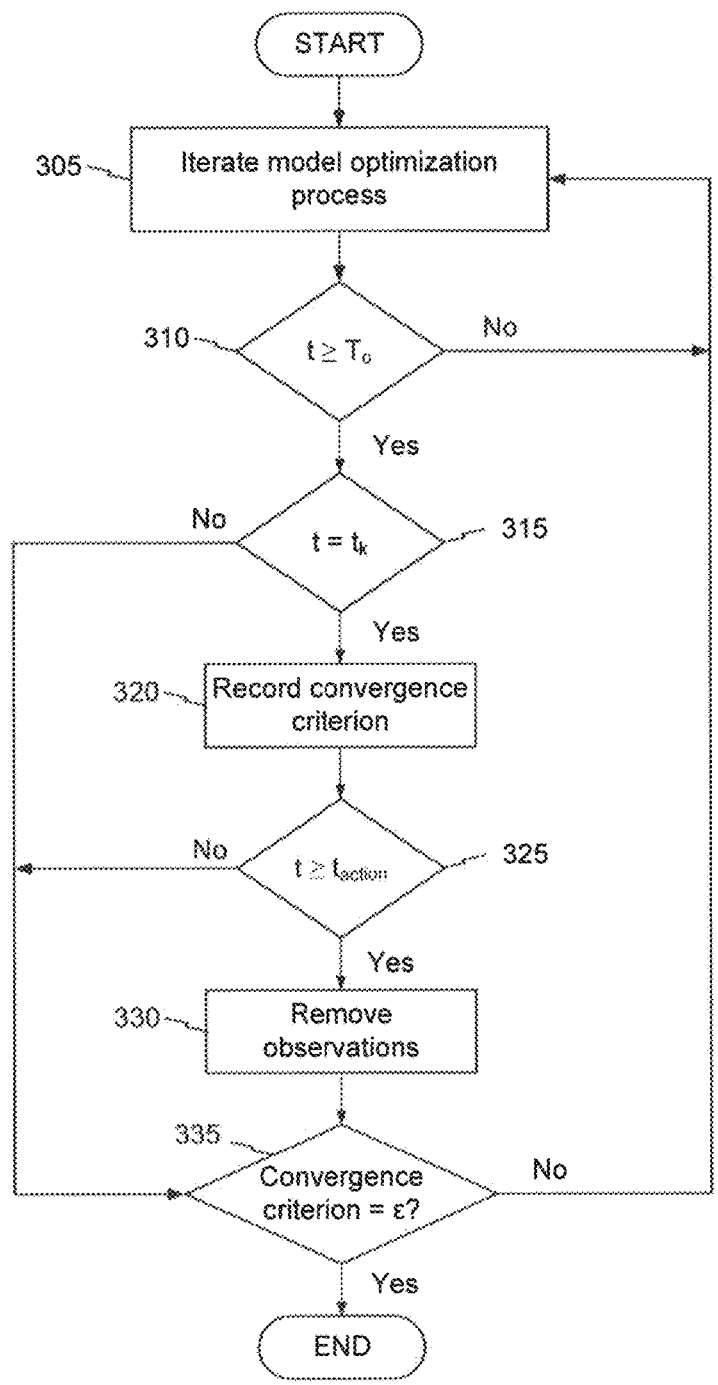
FIG. 3 illustrates a flowchart for an exemplary method for generating a classification model.

FIG. 3 illustrates a flowchart for an exemplary method of generating a classification model. The method of FIG. 3 may be performed by system 100, for example, by processor 105 and more specifically by the modules of subsystem 200.

System 100 may receive a set of training data, which includes N observations. Each observation may be associated with a known classification. At step 305, system 100 may begin iterating a model optimization process (e.g., ISDA, SMO, quadratic programming, etc.) for a classification model (e.g., SVM model). Each iteration may be associated with an iteration index t (e.g., the initial classification model is generated at t=1, the initial classification model is updated in the next iteration of the optimization process at t=2, etc.).

In one example, in which the classification model is a SVM model, the model optimization process may attempt to solve the following quadratic programming (QP) problem:

$$\text{Minimize: } L(\alpha) = \frac{1}{2}\sum_{i=1}^{N}\sum_{j=1}^{N}\alpha_i\alpha_j y_i y_j G(x_i, x_j) - \sum_{n=1}^{N}\alpha_n \quad \text{(Eq. 1)}$$

subject to:

$$\sum_{n=1}^{N}\alpha_n y_n = 0 \quad \text{(Eq. 2)}$$

$$\forall n: C \geq \alpha_n \geq 0 \quad \text{(Eq. 3)}$$

Satisfying Karush-Kuhn-Tucker (KKT) complementarity conditions $$\forall n: \alpha_n[y_n f(x_n) - 1 + \xi_n] = 0 \quad \text{(Eq. 4)}$$

$$\forall n: \xi_n(C - \alpha_n) = 0 \quad \text{(Eq. 5)}$$

where:
N is the number of observations in the training data,
$y_n$ is a class label (−1 or +1) of observation n,
$x_n$ is a coordinate vector for observation n,
G is a kernel function, and
$\alpha_n$'s are the sought coefficients.

The KKT conditions use C as a positive box constraint on the $\alpha_n$ coefficients and $\xi_n$ as non-negative slack variables. After the $\alpha_n$ coefficients are found by solving the QP problem a prediction (SVM score) at point x can be computed by:

$$f(x) = \sum_{i=1}^{N}\alpha_i y_i G(x_i, x) + b \quad \text{(Eq. 6)}$$

where b is a bias term. The predicted score f(x) may range continuously from −Inf to +Inf. Large negative values represent confident classification into class −1, large positive values represent confident classification into class +1, and values near zero imply uncertain classifications.

Several algorithms can be used to solve the QP problem shown above on large datasets, such as ISDA and SMO. ISDA and SMO are based on an iterative process that inspects a subset of the data at each step. The number of iterations to convergence for the process can vary. For example, the number of iterations may vary from a few dozen to a few million. One way SMO differs from ISDA is that SMO respects a linear constraint:

$$\sum_{n=1}^{N}\alpha_n y_n = 0 \quad \text{(Eq. 7)}$$

In some embodiments, for small datasets, a standard QP solver such as, for example, interior-point methods, may be used.

After an iteration of the model optimization process at step 305, system 100 may determine if the iteration index t equals or is greater than a burn-in parameter $T_0$ (step 310). In one embodiment, a user may provide $T_0$ as an input. In another embodiment, $T_0$ may be a pre-set default value, e.g., 1000. If the iteration index is not equal to or greater than the burn-in parameter $T_0$ (step 310: No), system 100 may perform another iteration of the model optimization process (step 305) and the iteration index increases by one. Until the iteration index t is equal to the burn-in parameter $T_0$, system 100 may simply continue to iterate the model optimization process. This period is referred to as the burn-in period.

When the iteration index t eventually equals or is greater than the burn-in parameter $T_0$ (step 310: Yes), system 100 may determine if the iteration index t is equal to one of predetermined indices $t_k$ (step 315). In one embodiment, $t_k$ of step 315 may be set by a user by the user inputting a parameter k, where k represents a constant interval. In such embodiment, indices $t_k$ may be iteration indices that are spaced every k indices. For example, if k=100, then $t_k$ may be the iteration indices {100, 200, 300, 400, ...}. In another embodiment, k may be pre-set to a default value independent of a user's setting k. If the present iteration index t is equal to one of the $t_k$ indices (step 315: Yes), then system 100 may record a convergence criterion of the current classification model as updated by the latest iteration (step 320). If the iteration index t does not equal $t_k$ (step 315: No), then system 100 may proceed to step 335.

After recording the convergence criterion at step 320, system 100 may determine whether the iteration index t is equal to or greater than $t_{action}$ (step 325). $t_{action}$ of step 325 represents the first iteration index at which observation removal from the training data may begin. In one embodiment, a user may provide $t_{action}$ as an input. In another embodiment, $t_{action}$ may be pre-set to a default value. If the iteration index is not equal to or greater than $t_{action}$ (step 325: No), then system 100 may proceed to step 335. If the iteration index equals $t_{action}$ (step 325: Yes), system 100 may remove observations from the training data (step 330). Details of step 330 are described in further detail with reference to FIG. 4.

Figure 4:
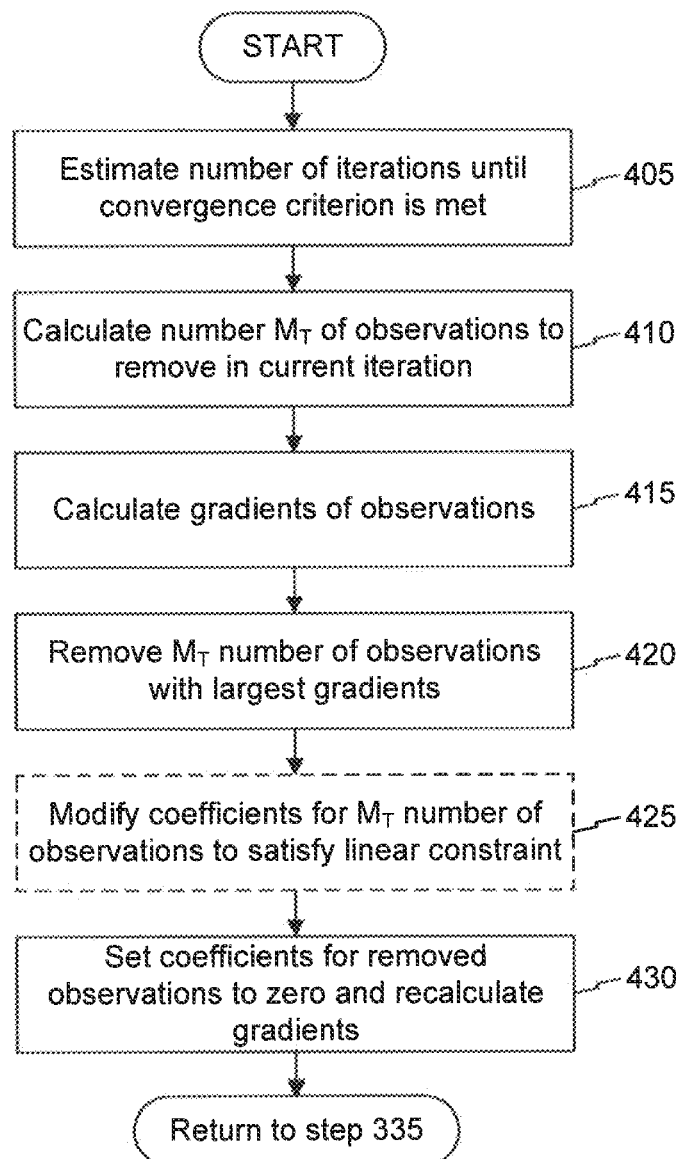
FIG. 4 illustrates a flowchart for an exemplary method for removing observations from a training data set.
Figure 5:
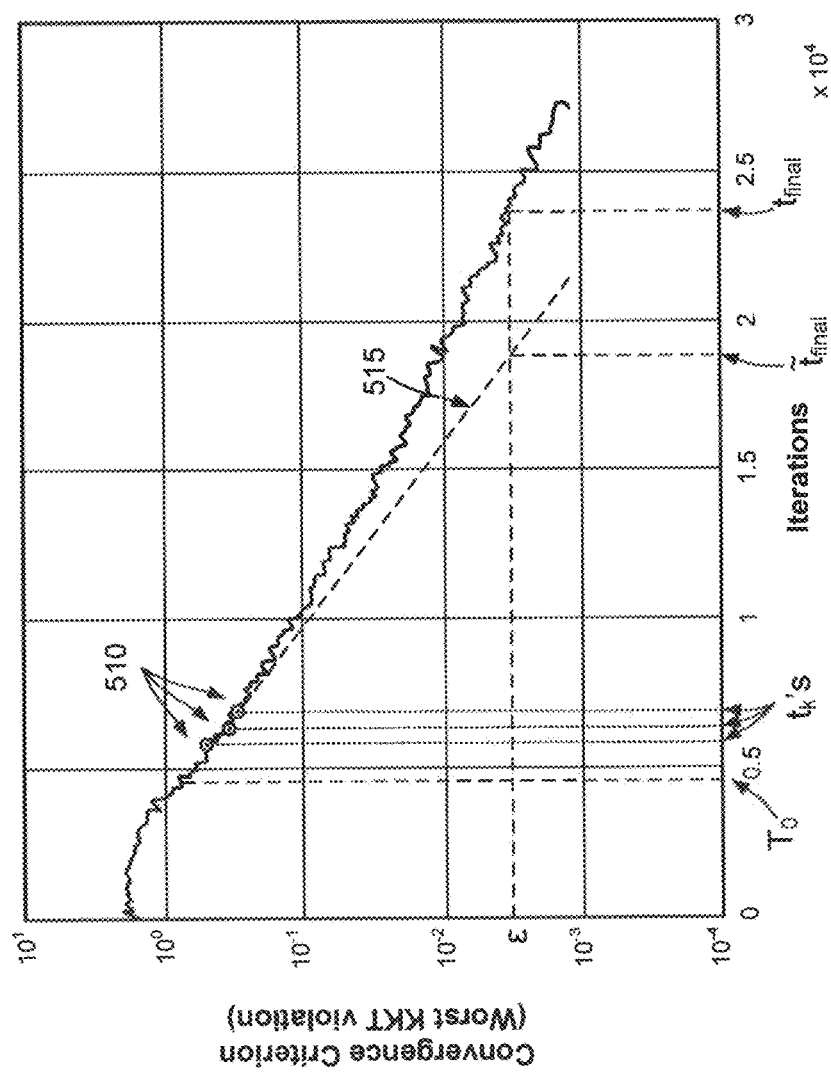
FIG. 5 illustrates a graph that plots the logarithm of the convergence criterions of a classification model with respect to iteration indices.

FIG. 4 illustrates a flowchart for an exemplary method of removing observations from the training data (step 330). At step 405, system 100 may estimate the number of additional iterations needed until a tolerance threshold $\epsilon$ is met. In one embodiment, system 100 may determine an estimate of additional iterations, based on the convergence criterions recorded so far. For instance, in one example, the logarithm of the convergence criterion is linearly related to the iteration index, after a burn-in period $T_0$. FIG. 5 illustrates a graph that plots the logarithm of the convergence criterions versus the iteration index for an exemplary instance of iterating a model optimization process for a given initial training data set. After an initial period, which may have terminated by the end of the burn-in period $T_0$, the logarithm of the convergence criterion shown in FIG. 5 maintains an approximately linearly proportional relation to the iteration index. In this example, system 100 can extract the linear slope and extrapolate future convergence criterions using the linear slope to obtain the iteration index $\tilde{t}_{final}$, where $\tilde{t}_{final}$ represents an estimate of the iteration index at which the convergence criterion will meet a tolerance threshold $\epsilon$. For example, based on recorded convergence criterions 510, system 100 may determine an extrapolation 515. (Note that the graph shown in FIG. 5 is for illustrative purposes only. For example, in some embodiments, there would be additional recorded convergence criterions between iteration $T_0$ and the first explicitly marked $t_k$ iteration. Those additional recorded convergence criterions are not shown for visual clarity.) Based on extrapolation 515, system 100 may determine $\tilde{t}_{final}$ as an estimate of the iteration index at which the convergence criterion meets the tolerance threshold $\epsilon$. $\tilde{t}_{final}$ may change as system 100 records additional convergence criterions at subsequent indices $t_k$ and updates extrapolation 515 based on the convergence criterions that have been recorded up to the present index. In another embodiment, the extrapolation of the convergence criterion may be a non-linear extrapolation or some other type of extrapolation. For example, the convergence criterions may be modeled as a higher-order smooth function of the iteration index, and $\tilde{t}_{final}$ may be predicted based on the higher-order smooth function.

At step 410, system 100 may calculate the number $M_t$ of observations to remove in the current iteration. For example, there may be total number of desired observations that system 100 is to remove by the actual final iteration $t_{final}$ at which the criterion value meets the tolerance threshold $\epsilon$. In one embodiment, this total number may be based on a parameter q, which represents a fractional number of the total number of observations in the training data that is to be removed by the final iteration $t_{final}$. A user may provide the parameter q or the parameter q may be a pre-set default number. Sometimes, to set the q parameter, the user may attempt to predict the number of outliers that exist in the training data set. Outliers are observations of one class that are found within a range that is predominantly classified as the other class. q may also be optimized by the user or system 100, for example by trying several values of q and choosing one that produces the model with the lowest generalization error. The total number of observations that are to be removed by the final iteration is represented by q*N=Q, wherein N is the original number of observations in the training data. System 100 may then determine the number $M_t$ of observations that should removed in the current iteration using, for example, Eq. 8:

$$M_t = \left\lfloor Q \frac{t}{\tilde{t}_{final}} \right\rfloor - M \qquad \text{(Eq. 8)}$$

where M is the total number of observations already removed and [a] is the floor of a. Using Eq. 8, system 100 may estimate $M_T$ based on the estimated final iteration ($\tilde{t}_{final}$), the number of iterations already performed (t), the total number of observations to be removed (Q), and the number of observations already removed from the training data set (M).

At step 415, system 100 may calculate the gradients of all of the observations currently in the training data set. In one embodiment, the gradient of each observation may be based on a summation of contributions from every other observation in the training data set. For example, the gradient may be determined according to Eq. 9:

$$g_n = y_n f(x_n) - 1 = \Sigma_{i=1}^N \alpha_i y_n y_G(x_i, x_n) - 1 \qquad \text{(Eq. 9)}$$

where:
$g_n$ is the gradient for a particular observation n,
$x_n$ is a coordinate vector for observation n,
i is the index corresponding to one of the N total number of observations in the training data,
$\alpha_i$ is the coefficient parameter corresponding to the ith observation (the coefficients being what the model optimization process is attempting to optimize and updates with each iteration),
$x_i$ is a coordinate vector for observation i, and
$G(x_i, x_n)$ is a kernel function based on $x_n$ and $x_i$.

If an observation is confidently classified into its true class ($f(x_n)$ has the same sign as $y_n$ and is large in magnitude), its gradient is positive and large. If an observation is badly misclassified ($f(x_n)$ has the sign opposite to $y_n$ and is large in magnitude), its gradient is negative and large.

At step 420, system 100 may remove the number $M_t$ of observations with the largest magnitude gradients from the training data set In some embodiments, system 100 may remove both positive and negative gradients. In some other embodiments, system 100 may remove only the observations with the largest negative gradients (i.e. the badly misclassified observations). In some embodiments, system 100 may not remove any observations from the training data if $M_t$ is zero or negative. In some embodiments, system 100 may add observations that were previously removed back into the training data if $M_t$ is negative. Subsequent iterations of the model optimization process will use the updated training data set with the observations removed instead of the full training data set.

Because, in some embodiments, $M_t$ is based on how quickly the convergence criterion approaches the tolerance threshold $\epsilon$, the number of observations to be removed from the training data may depend on how quickly the convergence criterion approaches the tolerance threshold $\epsilon$. If convergence is fast, system 100 may remove many observations from the training data set at each iteration index $t_k$. If the convergence is slow, system 100 may remove few observations from the training data set at each iteration index $t_k$. If there is no convergence, system 100 may not remove any observations from the training data set, or optionally may add back in observations that were previously removed from the training data set.

In some embodiments, ISDA is the model optimization process being used. In such embodiments, because ISDA does not respect the linear constraint of Eq. 7, removing observations from the training data may be a straightforward process of removing $M_T$ observations. However, in some embodiments in which SMO is the model optimization process being used, because SMO does respect the linear constraint of Eq. 7, this linear constraint must be satisfied when observations are removed from the training data set. In an exemplary embodiment, the method of FIG. 4 includes an additional step 533 to satisfy the condition of the linear constraint. At step 533, if the $M_t$ observations slated for removal satisfy the linear constraint of Eq. 7 (i.e., $\Sigma_{n \in M_t} \alpha_n y_n = 0$), system 100 may remove all of the slated $M_t$ observations from the training data. If the observations do not satisfy the linear constraint, system 100 may find a modified set of $\alpha_n$ coefficients ($\tilde{\alpha}_n$ coefficients) for the $M_t$ observations, such that $\Sigma_{n \in M_t} \tilde{\alpha}_n y_n = 0$, while attempting to maximize the number of zero $\tilde{\alpha}_n$ coefficients. The observations for which $\tilde{\alpha}_n = 0$ are then removed from the training data set, and the coefficients for the remaining observations are updated by updating $\alpha_n$ with $\tilde{\alpha}_n$.

At step 430, for both ISDA, SMO, or other classification models, system 100 may set the coefficients $\alpha_n$ corresponding to the observations that were removed to zero, and recalculate the gradients for all of the observations remaining in the training data, to reflect the fact that the removed observations are no longer in the training data.

With reference back to FIG. 3, at step 335, system 100 may determine if the convergence criterion of the classification model has reached a tolerance threshold $\epsilon$. A user may input the tolerance threshold $\epsilon$, or the tolerance threshold $\epsilon$ may be pre-set to a default value. If the convergence criterion does not meet the tolerance threshold $\epsilon$, system 100 may return to step 305 and perform another iteration of the model optimization process. If the convergence criterion meets the tolerance threshold $\epsilon$, then system 100 may output the classification model generated by the last iteration of the model optimization process.

Note that when system 100 repeats step 305, in the situation where the tolerance threshold has not been met yet, system 100 will generate new estimates of $t_{final}$, the estimated number of iterations until convergence is met. These new estimates will be based in part on new convergence criterions that are recorded at $t_k$ iterations, which may change the overall estimated slope of the convergence criterions with respect to the iteration index and the extrapolation of the convergence criterion to the final iteration. Therefore, although a final iteration $t_{final}$ at which the tolerance threshold $\epsilon$ is met is not actually known, system 100 may generate estimates $\tilde{t}_{final}$ of the final iteration that are periodically updated. Based on the updated estimates $\tilde{t}_{final}$, the system 100 can also periodically update its estimate of how many observations need to be removed at the $t_k$ iterations such that Q observations are removed by the final iteration, at which the tolerance threshold $\epsilon$ is met. While in some embodiments, the frequency of recording convergence criterions and removing observations may be the same (e.g., every k iterations), in other embodiments, the frequency of recording convergence criterions and the frequency of removing observations from the training data set may be different. For example, observations may be removed every k iterations and convergence criterions may be recorded every m iterations.

Figure 6:
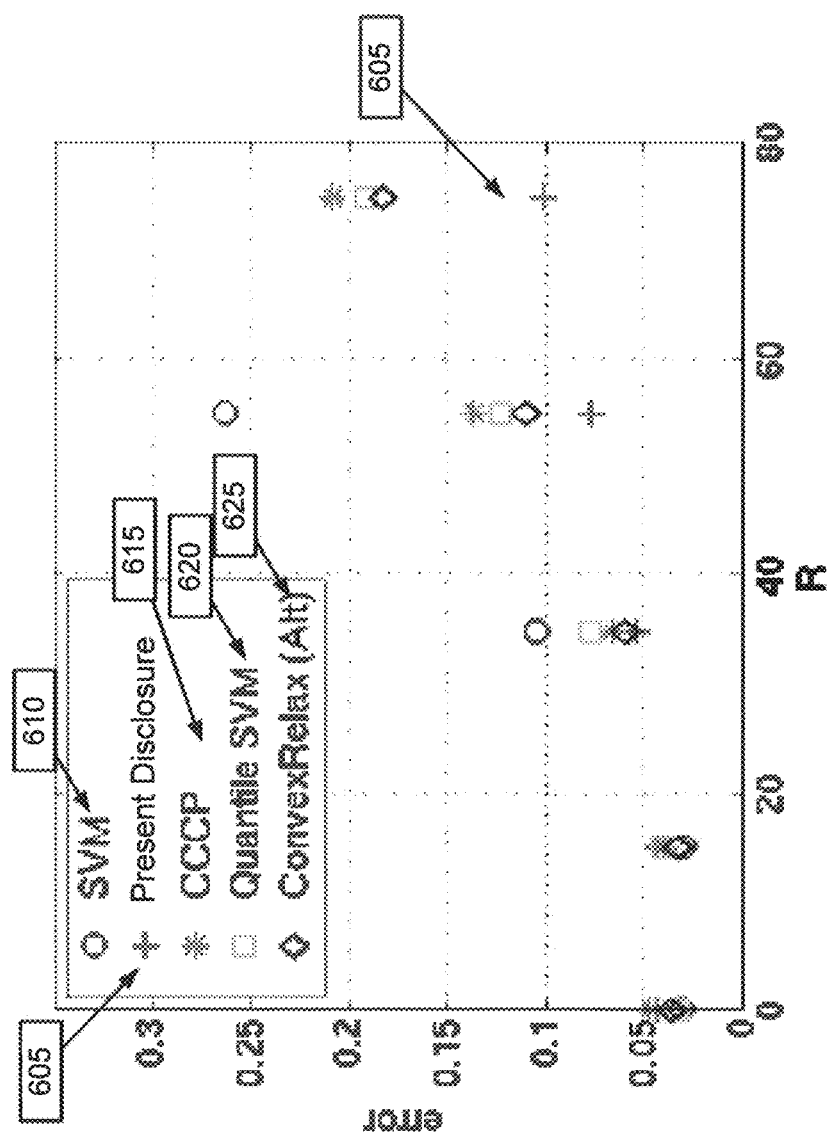
FIG. 6 illustrates a graph comparing the performance of a model generated according to an exemplary embodiment of the present disclosure to models generated using conventional techniques known in the art.

FIG. 6 illustrates a graph comparing the performance of a model generated according to an exemplary embodiment of the present disclosure to models generated by using conventional techniques known in the art. The model generated according to the present disclosure is indicated by label 605. The other models are indicated by labels 610 (normal SVM, wherein a model is generated by solving the SVM problem using a conventional SMO algorithm that does not take into account outliers), 615 (Convex-concave procedure (CCCP)), 620 (Quantile SVM), and 625 (ConvexRelax).

Normal SVM is described, for example, in R.-E. Fan, P.-H. Chen, and C.-J. Lin, Working set selection using second order information for training support vector machines. *Journal of Machine Learning Research*, 6:1889-1918, 2005. The convex-concave procedure (CCCP) is described, for example, in R. Collobert, F. Sinz, J. Weston, and L. Bottou. Trading Convexity for scalability, and in In *Proceedings of the 23rd international conference on Machine learning*, ICML '06, pages 201-208, New York, N.Y., USA, 2006. ACM. Quantile SVM is described, for example, in S. Ertekin, L. Bottou, and C. L. Giles. Ignorance is bliss: Non-convex online support vector machines. *IEEE Transactions on Pattern Recognition and Machine Intelligence*, 33(2):368-381, February 2011, and the ConvexRelax model is describe, for example, in Y. Ma, L. Li, X. Huang, and S. Wang. Robust support vector machine using least median loss penalty. In *Proceedings of the 18th IFAC World Congress*, volume 18, pages 11208-11213, 2011, and L. Xu, K. Crammer, and D. Schuurmans. Robust support vector machine training via convex outlier ablation. In *Proceedings of the 21st national conference on Artificial Intelligence—Volume 1*, AAAI'06, pages 536-542. AAAI Press, 2006.

Figure 7:
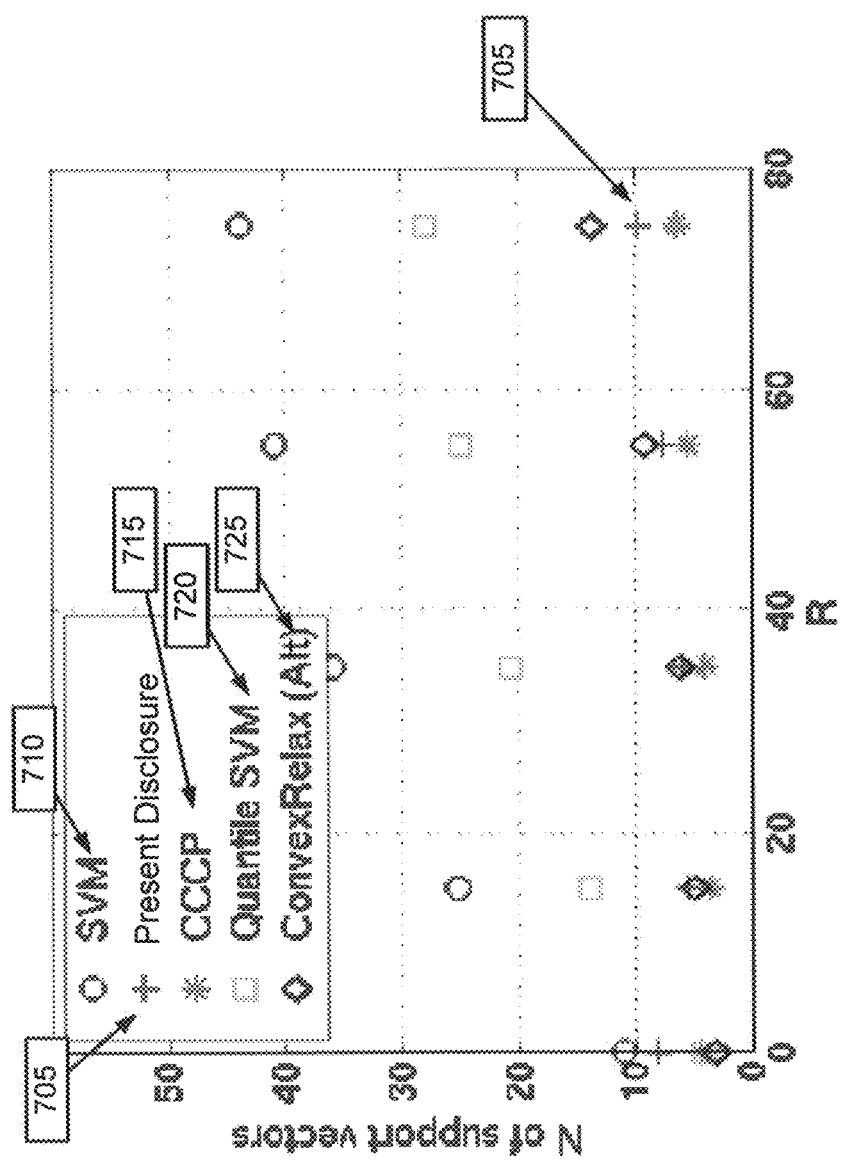
FIG. 7 illustrates another graph comparing the performance of a model generated according to an exemplary embodiment of the present disclosure to models generated using conventional techniques known in the art.

The classification error of the model generated according to this disclosure (indicated by labels 605) is less than that of other models (indicated by labels 610, 615, 620, and 625), particularly at larger R, where R represents a measure of label noise. Large values of R correspond to there being many outliers in the data, and small values of R correspond to there being a few outliers in the data. FIG. 7 illustrates another graph comparing models. In FIG. 7, the numbers of support vectors included in respective models are compared. The model generated according to the present disclosure is indicated by label 705. The other models are indicated by labels 710 (normal SVM), 715 (CCCP), 720 (Quantile SVM), and 725 (ConvexRelax). In general, an SVM model with a smaller number of support vectors is more desirable because such model may consume less computer memory and use less of the CPU to generate predictions for new data. In addition, if a model has only a few support vectors, the model may be open to easy interpretation by a human. The model generated according to the present disclosure (as indicated by label 705) includes fewer support vectors than some of the models generated using conventional techniques (e.g., the models indicated by labels 710, 720, and 725). For both of the graphs shown in FIG. 6 and FIG. 7, values of the q parameter used to generate the models were optimally set, regardless of the true fraction of outliers in the data. Table 1 compares the training times and sparsity (number of support vectors) of the different models for a given training dataset (the true number of outliers in the dataset in the example is 0.2). As can be seen in Table 1, at times an optimum q may be a value that differs from a value representing the actual number of outliers in the dataset.

TABLE 1

| Model Optimization Process | Fraction of Outliers q | Time for training s | Number of support vectors |
| --- | --- | --- | --- |
| Normal SVM | N/A | 31.7 | 10045 |
| CCCP | 0.2 | 64.6 | 640 |
| Quantile SVM | 0.2 | 344.4 | 5884 |
| ConvexRelax | 0.2 | 152.0 | 1724 |
| Present Disclosure | .5 | 18.7 | 1395 |
| Present Disclosure | 0.99 | 17.6 | 298 |

FIGS. 6 and 7 and Table 1 show that a classification model generated based on a training data set according to disclosed embodiments may be both faster to generate and more accurate in classifying new data than models generated by other, conventional techniques.

Exemplary embodiments of the invention may include a Technical Computing Environment (TCE) or may be performed by TCE. TCE may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE may include a dynamically-typed programming language (e.g., the M language, a MATLAB® language, a MATLAB-compatible language, a MATLAB-like language, etc.) that can be used to express problems and/or solutions in mathematical notations.

For example, TCE may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE may further provide mathematical functions and/or graphical tools (e.g., for creating plots, surfaces, images, volumetric representations, etc.). In one implementation, TCE may provide these functions and/or tools using toolboxes (e.g., toolboxes for signal processing, image processing, data plotting, parallel processing, etc.). Alternatively, or additionally, TCE may provide these functions as block sets or in another way, such as via a library, etc.

TCE may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, SimScape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE may provide mathematical routines and a high-level programming language suitable for non-professional programmers and may provide graphical tools that may be used for creating plots, surfaces, images, volumetric representations, or other representations. TCE may provide these routines and/or tools using toolboxes (e.g., toolboxes for signal processing, image processing, data plotting, parallel processing, etc.). TCE may also provide these routines in other ways, such as, for example, via a library, local or remote database (e.g., a database operating in a computing cloud), remote procedure calls (RPCs), and/or an application programming interface (API). TCE may be configured to improve runtime performance when performing computing operations. For example, TCE may include a just-in-time (JIT) compiler.

Processor 105 may include a processor, multiple processors, microprocessors, or other types of processing logic that may interpret, execute, and/or otherwise process information contained in, for example, a storage device and/or memory 110. The information may include computer-executable instructions and/or data that may implement one or more embodiments of the invention. Processor 105 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), reduced instruction set computing (RISC)-based processing devices (e.g., ARM processors), or other types of processing logic that may interpret, execute, manipulate, and/or otherwise process the information. Processor 105 may comprise a single core or multiple cores. Moreover, processor 105 may comprise a system-on-chip (SoC), system-in-package (SiP), etc.

The foregoing description of the inventions, and associated embodiments, has been presented for purposes of illustration only. It is not exhaustive and does not limit the inventions to the precise form(s) disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Steps may alternatively be performed in parallel or in series. Similarly, the systems described need not necessarily include all parts described in the embodiments, and may also include other parts not describe in the embodiments.

Accordingly, the inventions are not limited to the above-described embodiments, but instead are defined by the appended claims in light of their full scope of equivalents.

The invention claimed is:

1. A system for generating a classification model comprising:
   at least one processor; and
   a non-transitory computer readable medium storing instructions that when executed by the at least one processor cause the at least one processor to perform operations including:
   iteratively updating a classification model using training data that includes observations with known classes and coordinate vectors, the updating during selected iterations including:
   calculating gradients for the observations using the known classes and the classification model, calculation of a gradient for an observation in the training data comprising:
   calculating kernel function values using a kernel function, a coordinate vector of the observation, and coordinate vectors of other observations in the training data, and
   determining the gradient for the observation using the kernel function values,
   determining a number of observations to identify in the training data,
   identifying the determined number of observations in the training data using at least one of magnitudes and directions of the gradients for the observations,
   updating the training data by removing at least one of the identified observations, and
   updating the classification model based on the updated training data, and
   outputting the classification model.

2. The system of claim 1, wherein the updating during the selected iterations further comprises estimating a final iteration index in which a convergence criterion of the classification model meets a tolerance threshold by extrapolating future convergence criterions using recorded convergence criterions; and wherein the number of observations is determined using the final iteration index and a current iteration index.

3. The system of claim 2, wherein the extrapolation uses at least one of a log-linear approximation, a non-linear approximation and a higher-order smooth function approximation.

4. The system of claim 1, wherein the updating during the selected iterations further comprises determining that coefficients of the classification model corresponding to the identified observations do not satisfy a linear constraint, and generating modified coefficients corresponding to the identified observations that satisfy the linear constraint; and wherein the modified coefficients corresponding to the at least one of the identified observations equal zero.

5. A computer-implemented method comprising:
   setting a first number of observations to remove from training data that includes observations with known classes and coordinate vectors;
   iteratively updating a classification model, by one or more processors, updating during selected iterations comprising:
   determining a second number of observations to identify as outlier observations in the training data,
   identifying the determined second number of outlier observations in the training data using the known classes and the classification model, the identification based on gradients for the observations in the training data, the gradients calculated using a kernel function and the coordinate vectors of the observations in the training data,
   updating the training data by removing at least one of the identified observations,
   updating the classification model based on the updated training data; and
   outputting the classification model.

6. The computer-implemented method of claim 5, wherein at least one iteration separates each of the selected iterations.

7. The computer-implemented method of claim 5, wherein the outlier observations comprise the most confidently classified observations in the training data.

8. The computer-implemented method of claim 5, wherein the outlier observations comprise the most confidently misclassified observations in the training data.

9. The computer-implemented method of claim 5, wherein the updating during the selected iterations further comprises calculating a gradient for at least one of the observations in the training data, and wherein the least one of the observations in the training data is identified as an outlier observation using at least one of a magnitude and a direction of the gradient.

10. The computer-implemented method of claim 5, wherein updating during the selected iterations further comprises determining that coefficients of the classification model corresponding to the outlier observations do not satisfy a linear constraint, and generating modified coefficients corresponding to the outlier observations that satisfy the linear constraint; and wherein the modified coefficients corresponding to the at least one of the identified observations equal zero.

11. The computer-implemented method of claim 5, wherein updating the classification model based on the updated training data comprises modifying coefficients of the classification model based on the updated training data.

12. The computer-implemented method of claim 5, wherein the classification model is a Support Vector Machine.

13. The computer-implemented method of claim 12, wherein the classification model is updated using at least one of iterative single data algorithm, sequential minimal optimization, and quadratic programming.

14. The computer-implemented method of claim 5, further comprising setting a tolerance threshold, and wherein updating during the selected iterations comprises estimating a final iteration index in which a convergence criterion of the classification model meets the tolerance threshold; and wherein the second number of observations to identify as the outlier observations is determined using the final iteration index and a current iteration index.

15. The computer-implemented method of claim 14, wherein estimating the final iteration index comprises extrapolating future convergence criterions using recorded convergence criterions.

16. The computer-implemented method of claim 15, wherein the extrapolation uses a log-linear approximation.

17. The computer-implemented method of claim 15, wherein the extrapolation uses at least one of a non-linear approximation and a higher-order smooth function approximation.

18. A non-transitory computer readable medium storing instructions that when executed by at least one processor cause the at least one processor to perform operations including:
   iteratively updating a classification model using training data that includes observations with known classes and coordinate vectors, the updating during selected iterations including:
      calculating gradients for the observations using the known classes and the classification model, calculation of a gradient for an observation in the training data comprising:
         calculating kernel function values using a kernel function, a coordinate vector of the observation, and coordinate vectors of other observations in the training data, and
         determining the gradient for the observation using the kernel function values,
      determining a number of observations to identify in the training data,
      identifying the determined number of observations in the training data using at least one of magnitudes and directions of the gradients for the observations,
      updating the training data by removing at least one of the identified observations, and
      updating the classification model based on the updated training data, and
   outputting the classification model.

19. The non-transitory computer readable medium of claim 18, wherein the updating during the selected iterations further comprises estimating a final iteration index in which a convergence criterion of the classification model meets a tolerance threshold by extrapolating future convergence criterions using recorded convergence criterions; and wherein the number of observations is determined using the final iteration index and a current iteration index.

20. The non-transitory computer readable medium of claim 19, wherein updating during the selected iterations further comprises determining that coefficients of the classification model corresponding to the identified observations do not satisfy a linear constraint, and generating modified coefficients corresponding to the identified observations that satisfy the linear constraint; and wherein the modified coefficients corresponding to the at least one of the identified observations equal zero.

* * * * *